United States Patent
Chen et al.

(10) Patent No.: US 12,034,632 B2
(45) Date of Patent: Jul. 9, 2024

(54) FAULT PROTECTION METHOD, NODE, AND STORAGE MEDIUM

(71) Applicant: Huawei Technologies Co., Ltd., Shenzhen (CN)

(72) Inventors: Shi Chen, Nanjing (CN); Xiaomin Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 17/474,318

(22) Filed: Sep. 14, 2021

(65) Prior Publication Data

US 2021/0409312 A1   Dec. 30, 2021

Related U.S. Application Data

(63) Continuation of application No. PCT/CN2019/119999, filed on Nov. 21, 2019.

(30) Foreign Application Priority Data

Mar. 15, 2019  (CN) .......................... 201910199321.1

(51) Int. Cl.
*H04L 45/12* (2022.01)
*H04L 12/46* (2006.01)
(Continued)

(52) U.S. Cl.
CPC .......... *H04L 45/28* (2013.01); *H04L 12/4633* (2013.01); *H04L 45/04* (2013.01);
(Continued)

(58) Field of Classification Search
CPC ... H04L 12/46; H04L 12/4633; H04L 12/721; H04L 12/723; H04L 12/781; H04L 45/02;
(Continued)

(56) References Cited

U.S. PATENT DOCUMENTS 8,565,098 B2 * 10/2013 Liu ..................... H04L 43/0811
370/242
9,407,496 B2 *  8/2016 Wen ................... H04L 41/0663
(Continued)

FOREIGN PATENT DOCUMENTS

CN    1933448 A    3/2007
CN  101133408 A    2/2008
(Continued)

OTHER PUBLICATIONS

Technology White Paper, Fast Reroute with Segment Routing Extending Fast Reroute coverage in LDP-based MPLS networks, Alcatel-Lucent, 17 pages, 2015.*
(Continued)

*Primary Examiner* — Frank Duong
(74) *Attorney, Agent, or Firm* — Slater Matsil, LLP

(57) ABSTRACT

This application discloses a fault protection method, including: A first node determines that a first cross-domain node is faulty. The first node is a head node of a segment routing best effort SR-BE service tunnel, the SR-BE tunnel is a cross-domain tunnel that passes through a first IGP domain and a second IGP domain, the SR-BE tunnel passes through the first cross-domain node, and the first cross-domain node is a node that crosses the first IGP domain and the second IGP domain. The first node switches a service transmission path from the SR-BE tunnel to a backup tunnel. The backup tunnel does not pass through the first cross-domain node, and the backup tunnel is a tunnel with a strict explicit path.

20 Claims, 7 Drawing Sheets

(51) Int. Cl.
*H04L 45/00* (2022.01)
*H04L 45/02* (2022.01)
*H04L 45/28* (2022.01)
*H04L 45/50* (2022.01)

(52) U.S. Cl.
CPC .............. *H04L 45/12* (2013.01); *H04L 45/22* (2013.01); *H04L 45/50* (2013.01)

(58) Field of Classification Search
CPC ....... H04L 45/04; H04L 45/12; H04L 45/122; H04L 45/123; H04L 45/18; H04L 45/22; H04L 45/24; H04L 45/28; H04L 45/34; H04L 45/50
See application file for complete search history.

(56) References Cited

U.S. PATENT DOCUMENTS

| | | | |
|---|---|---|---|
| 9,660,897 B1 | 5/2017 | Gredler | |
| 9,838,246 B1* | 12/2017 | Hegde | ...................... H04L 45/18 |
| 10,666,550 B2* | 5/2020 | Decraene | ................ H04L 45/28 |
| 10,992,574 B2* | 4/2021 | Peng | ................ H04L 45/50 |
| 11,146,480 B2* | 10/2021 | Hu | ........................ H04L 45/72 |
| 2006/0126502 A1 | 6/2006 | Vasseur et al. | |
| 2006/0153067 A1* | 7/2006 | Vasseur | .................. H04L 45/03 370/242 |
| 2007/0180105 A1* | 8/2007 | Filsfils | .................... H04L 45/00 709/224 |
| 2013/0336103 A1* | 12/2013 | Vasseur | ................... H04L 45/50 370/216 |
| 2015/0381406 A1* | 12/2015 | Francois | ................ H04L 45/28 370/218 |
| 2020/0099610 A1* | 3/2020 | Heron | .................... H04L 45/22 |
| 2020/0296025 A1* | 9/2020 | Wang | ................. H04L 12/4633 |
| 2021/0399979 A1* | 12/2021 | Sikhivahan | ............ H04L 45/18 |

FOREIGN PATENT DOCUMENTS

| | | |
|---|---|---|
| CN | 101521601 A | 9/2009 |
| CN | 103475578 A | 12/2013 |
| CN | 104618233 A | 5/2015 |
| CN | 107154888 A | 9/2017 |
| CN | 107438026 A | 12/2017 |
| CN | 107888496 A | 4/2018 |
| WO | 2013044408 A1 | 4/2013 |

OTHER PUBLICATIONS

Li, Comparison between Segment Routing and LDP/RSVP-TE, draft-li-spring-compare-sr-Idp-rsvpte-00, Internet-Draft, 33 pages, Mar. 8, 2015.*

Filsfils, C. et al., "Segment Routing Architecture" Internet Engineering Task Force (IETF), RFC 8402, Jul. 2018, 32 pages.

Pignataro, C. et al. "Seamless Bidirectional Forwarding Detection (S-BFD)", Internet Engineering Task Force (IETF), RFC 7880, Jul. 2016, 24 pages.

Bashandy, A. et al., "Topology Independent Fast Reroute using Segment Routing"; draft-ietf-rtgwg-segment-routing-ti-lfa-00, Dec. 3, 2018, 19 pages.

Ayyangar, A. et al., "Inter domain GMPLS Traffic Engineering—RSVP-TE extensions", draft-ietf-ccamp-i nter-domain-rsvp-te-03.txt, IETF Internet Draft, Mar. 2006, 24 pages.

* cited by examiner

FAULT PROTECTION METHOD, NODE, AND STORAGE MEDIUM

CROSS-REFERENCE TO RELATED APPLICATIONS

This application is a continuation of International Application No. PCT/CN2019/119999, filed on Nov. 21, 2019, which claims priority to Chinese Patent Application No. 201910199321.1, filed on Mar. 15, 2019, both of which are hereby incorporated by reference in their entireties.

TECHNICAL FIELD

This application relates to the field of communications technologies, and in particular, to a fault protection method.

BACKGROUND

Segment routing (SR) is a method that a control plane, by using an interior gateway protocol (IGP), transfers a multi-protocol label switching (MPLS) label that corresponds to an SR router and that is of a global node or of a local node. A segment routing best effort (SR-BE) service is one of segment routing methods. An optimal segment routing label switching path (SR LSP) is calculated by the IGP by using a shortest path first (SPF) algorithm.

Currently, for the SR-BE, if nodes on a path are in a same IGP domain, a backup tunnel calculation method may be a topology-independent loop-free alternate (TI-LFA) fast reroute algorithm. The TI-LFA algorithm calculates extended P space, Q space, and a post-convergence shortest path tree based on a protection path, calculates a repair list based on different scenarios, and establishes an SR-BE tunnel between a head node and a PQ node to form a backup path to a next hop for protection. When the node on the path is faulty, the service is automatically switched to the backup tunnel and forwarding continues. This improves network reliability.

However, in a scenario in which the nodes on the path are located in two or more IGP domains, a primary cross-domain node and a secondary cross-domain node are included between every two IGP domains, and a route of one IGP domain is preferentially advertised to the other IGP domain by using the primary cross-domain node. When the primary cross-domain node is faulty, using the TI-LFA algorithm cannot automatically switch packet forwarding to the secondary cross-domain node. Usually, a fault of the primary cross-domain node is detected through IGP convergence. During IGP convergence, a packet is still preferentially forwarded to the primary cross-domain node on a selected forwarding path. This causes packet loss for a long time, and poor network reliability.

SUMMARY

Embodiments of this application provide a fault protection method, a node, and a storage medium. A path that does not pass through a primary cross-domain node is pre-calculated as a backup tunnel, and the backup tunnel is a tunnel with a strict explicit path. When the primary cross-domain node is faulty, a service transmission path is directly switched to the backup tunnel, to improve network reliability.

To resolve the foregoing technical problem, the embodiments of this application provide the following technical solutions.

According to a first aspect of this application, a fault protection method is provided. The method may include: A first node determines that a first cross-domain node is faulty. The first node is a head node of a segment routing best effort SR-BE service tunnel. The SR-BE tunnel is a cross-domain tunnel that passes through a first IGP domain and a second IGP domain, and the first IGP domain is different from the second IGP domain. The SR-BE tunnel passes through the first cross-domain node, and the first cross-domain node is a node that crosses the first IGP domain and the second IGP domain, and is configured to advertise a route of the first IGP domain to the second IGP domain or advertise a route of the second IGP domain to the first IGP domain. The first node switches a service transmission path from the SR-BE tunnel to a backup tunnel. The backup tunnel does not pass through the first cross-domain node, the backup tunnel is a cross-domain tunnel that passes through the first IGP domain and the second IGP domain, and the backup tunnel is a tunnel with a strict explicit path, that is, the backup tunnel is specified by a strict label stack, so that a service packet may be forwarded along the backup tunnel. It can be learned from the foregoing first aspect that, when determining that the first cross-domain node is faulty, the first node may directly switch the service transmission path to the backup tunnel, to improve network reliability.

Optionally, with reference to the first aspect, in a first possible implementation, the method may further include: The first node obtains the backup tunnel based on a first node set. The first node set does not include the first cross-domain node.

Optionally, with reference to the first possible implementation of the first aspect, in a second possible implementation, that the first node obtains the backup tunnel based on a first node set may include: The first node determines a first shortest path from the first node to a tail node based on the first node set. The first shortest path is the backup tunnel. The second possible implementation of the first aspect provides a specific manner of determining a backup tunnel.

Optionally, with reference to the first aspect or the first or the second possible implementation of the first aspect, in a third possible implementation, after the first node switches the service transmission path from the SR-BE tunnel to the backup tunnel, the method may further include: The first node sends a first packet through the backup tunnel. A label stack is encapsulated in the first packet, and the label stack specifies each node that the backup tunnel passes through.

Optionally, with reference to the first possible implementation of the first aspect, in a fourth possible implementation, that the first node obtains the backup tunnel based on a first node set may include: The first node determines a second shortest path from the first node to a second cross-domain node based on the first node set. The second shortest path and a third shortest path from the second cross-domain node to a tail node jointly form the backup tunnel, the third shortest path does not pass through the first cross-domain node, and the second cross-domain node is a node that crosses the first IGP domain and the second IGP domain.

Optionally, with reference to the fourth possible implementation of the first aspect, in a fifth possible implementation, after the first node switches the service transmission path from the SR-BE tunnel to the backup tunnel, the method may further include: The first node sends a second packet through the second shortest path. A label stack is encapsulated in the second packet, and the label stack specifies each node that the second shortest path passes through.

Optionally, with reference to the first aspect or the first to the fifth possible implementations of the first aspect, in a sixth possible implementation, before the first node determines that the first cross-domain node is faulty, the method may further include:

A bidirectional forwarding detection BFD session is established between the first node and the first cross-domain node. That a first node determines that a first cross-domain node is faulty may include: The first node determines, based on the BFD session, that the first cross-domain node is faulty.

Optionally, with reference to the first aspect or the first to the sixth possible implementations of the first aspect, in a seventh possible implementation, before the first node determines that the first cross-domain node is faulty, the method may further include:

The first node sends a third packet through the SR-BE tunnel. An outer label of the third packet is a node label of a next hop to a destination address.

According to a second aspect of this application, a node is provided. The node has a function of implementing the method in any one of the first aspect or the possible implementations of the first aspect. The function may be implemented by hardware, or may be implemented by hardware by executing corresponding software. The hardware or the software includes one or more modules corresponding to the function.

According to a third aspect of this application, a computer-readable storage medium is provided. The computer-readable storage medium stores instructions, and when the instructions are run on a computer, the computer is enabled to perform the fault protection method in any one of the first aspect or the possible implementations of the first aspect.

According to a fourth aspect of this application, a computer program product including instructions is provided. When the computer program product is run on a computer, the computer is enabled to perform the fault protection method in any one of the first aspect or the possible implementations of the first aspect.

According to a fifth aspect of this application, a system is provided. The system may include a first node, a first cross-domain node, and a second cross-domain node. The first node is the first node described in any one of the first aspect or the possible implementations of the first aspect, the first cross-domain node is the first cross-domain node described in any one of the first aspect or the possible implementations of the first aspect, and the second cross-domain node is the second cross-domain node described in any one of the first aspect or the possible implementations of the first aspect.

In the embodiments of this application, a path that does not pass through a primary cross-domain node is pre-calculated as a backup tunnel, and the backup tunnel is a tunnel with a strict explicit path. When the primary cross-domain node is faulty, a service transmission path is directly switched to the backup tunnel, to improve network reliability.

DETAILED DESCRIPTION OF ILLUSTRATIVE EMBODIMENTS

Figure 1:
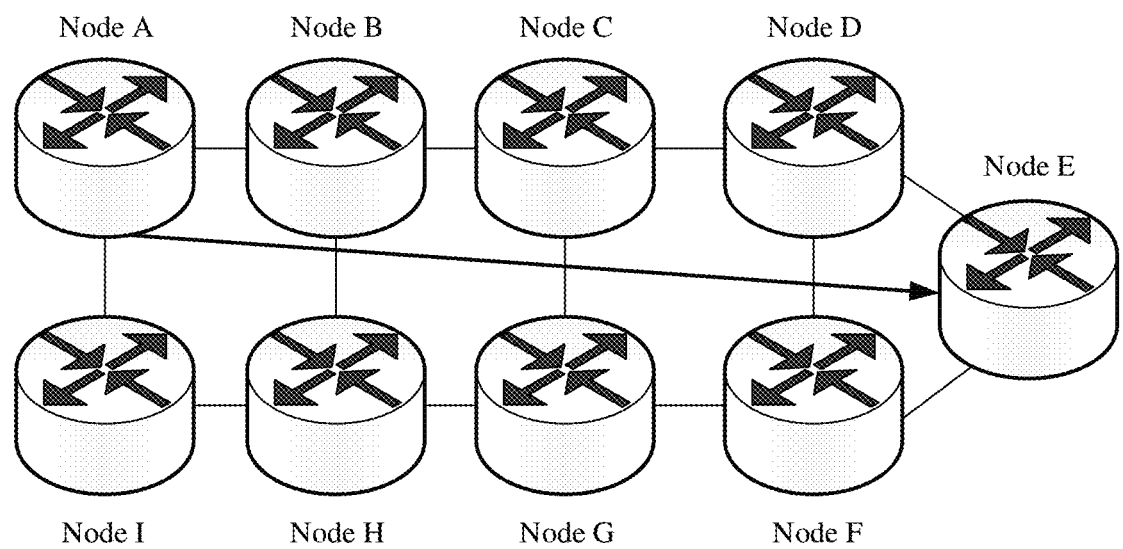
FIG. 1 is a schematic diagram of a forwarding process of an SR-BE tunnel in a same IGP domain.

The following describes embodiments of this application with reference to the accompanying drawings. It is clear that the described embodiments are merely a part rather than all of the embodiments of this application. A person of ordinary skill in the art may learn that as a technology evolves and a new scenario emerges, the technical solutions provided in the embodiments of this application are also applicable to a similar technical problem.

The embodiments of this application provide a fault protection method, a node, and a storage medium. A path that does not pass through a primary cross-domain node is pre-calculated as a backup tunnel, and the backup tunnel is a tunnel with a strict explicit path. When the primary cross-domain node is faulty, a service transmission path is directly switched to the backup tunnel, to improve network reliability. The following provides description in detail.

In the specification, claims, and accompanying drawings of this application, the terms "first", "second", and so on are intended to distinguish between similar objects but do not necessarily indicate a specific order or sequence. It should be understood that the data termed in such a way is interchangeable in a proper circumstance, so that the embodiments described herein can be implemented in other orders than the order illustrated or described herein. In addition, the terms "include", "contain", and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. Names or numbers of steps in this application do not mean that the steps in the method procedure need to be performed in a chronological/logical order indicated by the names or numbers. An execution sequence of the steps in the procedure that have been named or numbered may be changed based on technical objectives to be implemented, provided that a same or similar technical effect can be achieved. Division into modules in this application is logical division and may be another division in an actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic or another similar form. This is not limited in this application. In addition, modules or submodules described as separate components may be or may not be physically separated, or may be or may not be physical modules, or may not be grouped into a plurality of circuit modules. Objectives of the solutions of this application may be achieved by selecting some or all of the modules based on an actual requirement.

Segment routing (SR) is a method that a control plane, by using an interior gateway protocol (IGP), transfers a multi-protocol label switching (MPLS) label that corresponds to an SR router and that is of global significance or of local significance. A segment identifier is added to a packet by using a head node, to control a transmission path of the packet in an entire network. A basic concept of the SR is to divide the network into different segments, and then combine the segments to guide the packet to be forwarded along a specified path. A segment routing best effort (SR-BE) service is one of segment routing methods. An optimal segment routing label switching path (SR LSP) is calculated by the IGP by using a shortest path first (SPF) algorithm. In a same IGP domain, in a forwarding process of an SR-BE tunnel, the head node sends the packet through the SR-BE tunnel. An outer label of the packet is a node label of a next hop to a destination address. FIG. 1 is a schematic diagram of a forwarding process of an SR-BE tunnel in a same IGP domain. As shown in FIG. 1, the IGP domain includes a node A, a node B, a node C, a node D, a node E, a node F, a node G, a node H, and a node I. When the node A sends a packet to the node E, the node E first advertises a prefix segment identifier (SID) of the node E to each router in the IGP domain. Then, each router calculates an identifier of each router to the node E in a local link state database (LSDB) based on a segment routing global block (SRGB) and the prefix SID of the node E. It is assumed that, after calculation, identifiers of the node A to the node E, the node B to the node E, the node C to the node E, and the node D to the node E are respectively 5005, 4005, 3005, and 2005. It is assumed that a tunnel generated based on a shortest path of the IGP is from the node A to the node B to the node C to the node D to the node E. During forwarding, the tunnel generated based on the shortest path of the IGP is used for forwarding. Specifically, during forwarding, a node label of a next hop to a destination address is encapsulated to guide forwarding. To be specific, the node A encapsulates a label 4005. The node B, after receiving the label 4005, learns that the packet is forwarded to the node E, removes the original label, changes the original label to a label 3005, and sends the packet to the node C. The node C, after receiving the label 3005, learns that the packet is forwarded to the node E, removes the original label, changes the original label to a label 2005, and sends the packet to the node E.

For the SR-BE, if nodes on a path are in a same IGP domain, and an intermediate node is faulty, a backup tunnel calculation method may be a topology-independent loop-free alternate path fast reroute (topology Independent Loop-free-alternate algorithm, TI-LFA) algorithm. The TI-LFA algorithm calculates extended P space, Q space, and a shortest path tree based on a protection path, calculates a repair list based on different scenarios, and establishes an SR-BE tunnel between a head node and a PQ node to form a backup path to a next hop for protection. When a protection link is faulty, a service transmission path is automatically switched to a backup tunnel and forwarding continues. This improves network reliability.

Figure 2:
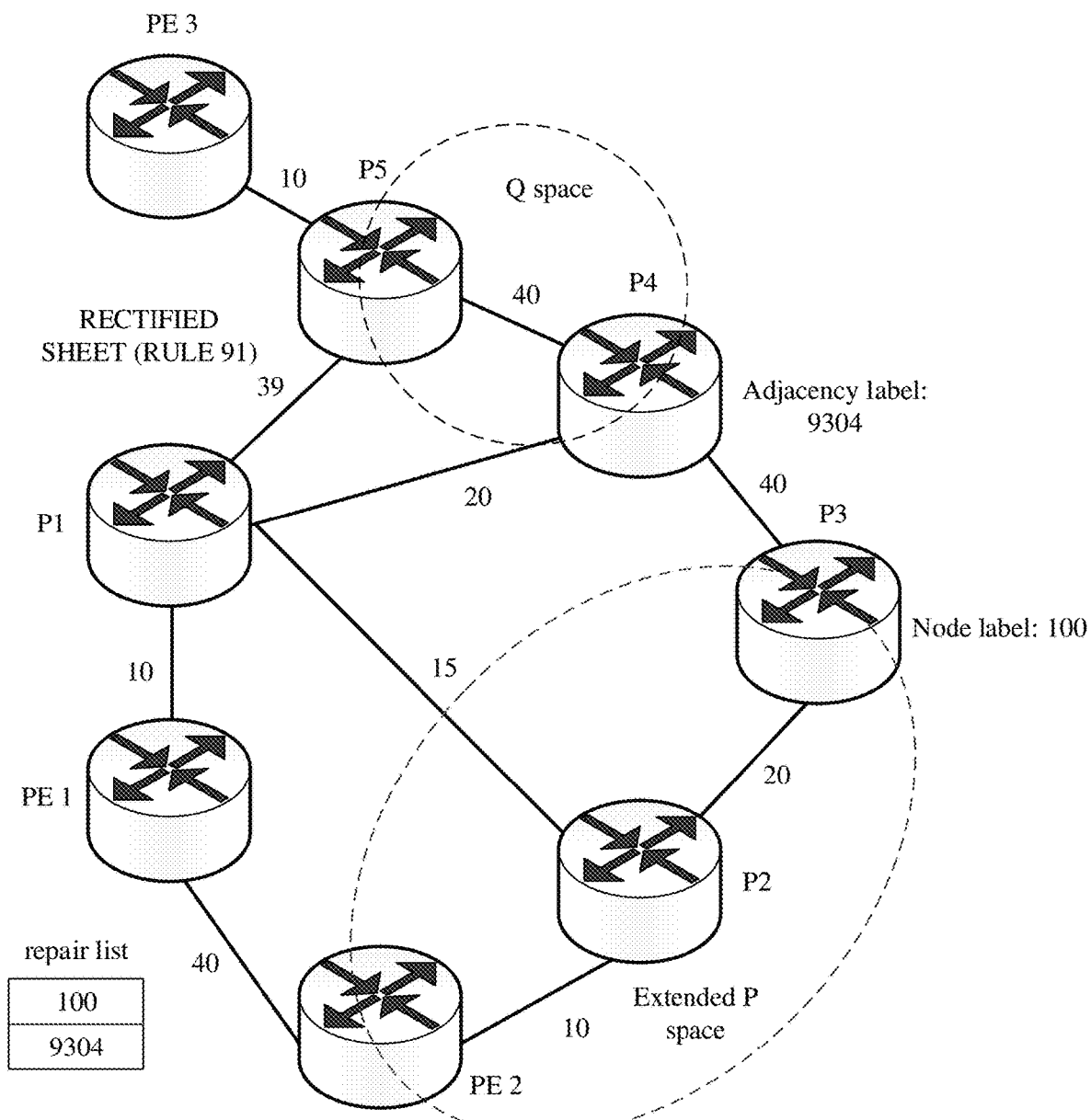
FIG. 2 is a schematic diagram of an implementation process of a TI-LFA in a same IGP domain.

In the embodiments of this application, the "node" may be a device that forwards a service packet. For example, the "node" may be a router, a switch, an optical transport network (OTN) device, a packet transport network (PTN) device, or a wavelength division multiplexing (WDM) device. The following describes an implementation process of a TI-LFA. FIG. 2 is a schematic diagram of an implementation process of a TI-LFA in a same IGP domain. It is assumed that a service transmission path is from a PE1 to a P1 to a P5 to a PE3. To avoid packet loss caused by a fault of a P1 node, the TI-LFA calculates extended P space, Q space, and a repair list repair list, and finally generates a backup forwarding entry, namely, a backup tunnel. A specific process is as follows: The extended P space is calculated first. In the extended P space, all neighbors of a head node are used as root nodes to establish SPF trees respectively. A node set that includes all reachable nodes starting from the root node and excluding the faulty node is referred to as the extended P space. As shown in FIG. 2, the head node is the PE1, and the P1 and a PE2 are the neighbors of the PE1. The P1 is not considered because the P1 is the faulty node. The SPF tree is established by using the PE2 as the root node. A path cost COST value is a ratio of a reference base to a physical bandwidth. The reference base is a specific value, and is usually set to be greater than a maximum link bandwidth. The physical bandwidth is a total bandwidth allocated to a link. After a COST value of each link is calculated according to a formula, the COST values of all the links that arrive at a destination are added to obtain a link set including a minimum COST value. The link set is a shortest path. It is assumed that a COST value between the PE1 and the PE2 is 40, a COST value between the PE1 and the P1 is 10, a COST value between the PE2 and a P2 is 10, a COST value between the P2 and the P1 is 15, a COST value between the P2 and a P3 is 20, a COST value between the P3 and a P4 is 40, a COST value between the P4 and the P5 is 40, a COST value between the P4 and the P1 is 20, a COST value between the P5 and the PE3 is 10, and a COST value between the P5 and the P1 is 39, shortest paths from the P2 to the PE2 and from the P3 to the PE2 do not need to pass through the faulty node, and shortest paths from the P4 to the PE2 and from the P5 to the PE2 need to pass through the faulty node. Therefore, the extended P space includes the PE2, the P2, and the P3. Then, the Q space is calculated by using a tail node as the root node to generate a reverse SPF tree. Shortest paths from the P5 to the PE3 and from the P4 to the PE3 do not need to pass through the faulty node, and shortest paths from the P3 to the PE3, from the P2 to the PE3, and from the PE2 to the PE3 need to pass through the faulty node. Therefore, the Q space includes the P4 and the P5. In FIG. 2, the extended P space and the Q space do not overlap, and a P node and a Q node with a shortest path distance are the P3 and the P4 respectively. The repair list is a constrained path, and is used to indicate how to reach the Q node. The repair list includes "a P node label and an adjacent label on a path from the P node to the Q node". In FIG. 2, the repair list includes a node label 100 of the P3 and an adjacent label 9304 from the P3 to the P4. In this case, the backup tunnel is generated, namely, the PE1 to the PE2 to the P2 to the P3 to the P4 to the P5 to the PE3.

Figure 3:
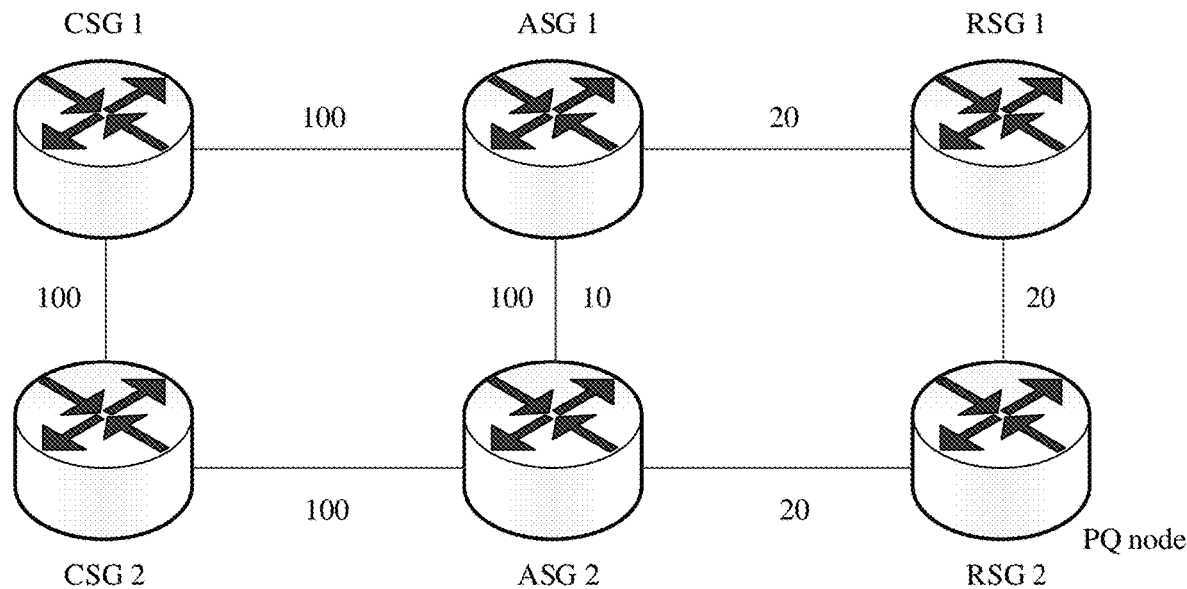
FIG. 3 is a schematic diagram of a forwarding process of an SR-BE tunnel in two IGP domains.

However, the TI-LFA algorithm is not applicable in some scenarios, for example, a scenario in which a node on a path is in two or more IGPs. To describe the problem, the following provides description by using an example of two IGP domains and a primary cross-domain node and a secondary cross-domain node in two IGP domains. FIG. 3 is a schematic diagram of a forwarding process of an SR-BE tunnel in two IGP domains. A cell site gateway (CSG) CSG 1 and a CSG 2 and an aggregation side gateway (ASG) ASG 1 and an ASG 2 belong to a first IGP domain. The ASG 1, the ASG 2, and a radio network controller site gateway (RSG) RSG 1 and an RSG 2 belong to a second IGP domain. The ASG 1 and the ASG 2 are cross-domain nodes. Routes of the CSG 1 and the CSG 2 is preferentially transmitted to the RSG 1 and RSG 2 by using the primary cross-domain node. Selection of the primary cross-domain node and the secondary cross-domain node is determined by a COST value. For example, in a scenario shown in FIG. 3, for a COST value of a CSG route in terms of an RSG, a COST value of a route imported by the ASG 1 is 100+20=120, and a COST value of a route imported by the ASG 2 is 100+100+10+20=230. Because 120 is less than 230, the ASG 1 is determined to be the primary cross-domain node and the ASG 2 is determined to be the secondary cross-domain node. It may be understood that a scenario with a plurality of IGP domains may be further developed based on the scenario with two IGP domains, that is, a network includes two or more IGP domains, and a primary cross-domain node and a secondary cross-domain node are included between each two IGP domains. For example, if a network includes three IGP domains, namely, a first IGP domain, a second IGP domain, and a third IGP domain. A first node and a second node are nodes that cross the first IGP domain and the second IGP domain, the first node is a primary cross-domain node, and the second node is a secondary cross-domain node. A third node and a fourth node are nodes that cross the second IGP domain and the third IGP domain, the third node is a primary cross-domain node, and the fourth node is a secondary cross-domain node. It should be understood that a scenario with a plurality of IGP domains is similar to the scenario with two IGP domains. Therefore, the scenario with a plurality of IGP domains is an extended application scenario or a specific application mode of the scenario with two IGP domains.

With reference to FIG. 3, the following describes the TI-LFA algorithm applicable to the scenario with two IGP domains. It is assumed that a packet is sent from the RSG 1 to the CSG 1, that is, a head node is the RSG 1 and a tail node is the CSG 1. To avoid packet loss caused by a fault of the primary cross-domain node ASG 1, extended P space is calculated according to the TI-LFA algorithm. As shown in FIG. 3, the head node is the RSG 1, and the ASG 1 and the RSG 2 are the neighbors of the RSG 1. The ASG 1 is not considered because the ASG 1 a faulty node. An SPF tree is established by using the RSG 2 as a root node. Shortest paths from the ASG 2 to the RSG 2, from the CSG 2 to the RSG 2, and from the CSG 1 to the RSG 2 do not need to pass through the faulty node. Therefore, the extended P space includes the ASG 2, the CSG 2, the CSG 1, and the RSG 2. Then, Q space is calculated by using the tail node as a root node to generate a reverse SPF tree. Shortest paths from the CSG 2 to the CSG 1, from the ASG 2 to the CSG 1, and from the RSG 2 to the CSG 1 do not need to pass through the faulty node. Therefore, the Q space includes the ASG 2, the CSG 2, and the RSG 2. In FIG. 3, the extended P space overlaps the Q space. The RSG 2 is a PQ node. The PQ node is a node in both the extended P space and the Q space. The PQ node is a destination end to protect a tunnel. According to the TI-LFA algorithm, an SR-BE tunnel is established between the head node and the PQ node to form a backup path to a next hop for protection, and the faulty node is the primary cross-domain node ASG 1. For the RSG 2, the ASG 1 is a remote fault, and the RSG 2 may detect that the ASG 1 is faulty only through IGP convergence. Convergence is a process of determining an alternative path when a path is unavailable, and is a process that all routers determine that a path is an optimal path. When a network event causes a route to be available or unavailable, the router sends update information. The route update information is transmitted in the entire network, causing recalculation of an optimal path, to obtain the optimal path determined by all routers. In the scenario corresponding to FIG. 3, the RSG 2 notifies all nodes in the domain of fault information hop by hop by using an IGP update message. During IGP convergence, a packet is always preferentially forwarded on a path selected by the RSG 2, instead of the ASG 1, and the packet is forwarded to the ASG 1 for a period of time, causing packet loss for a long time.

Figure 4:
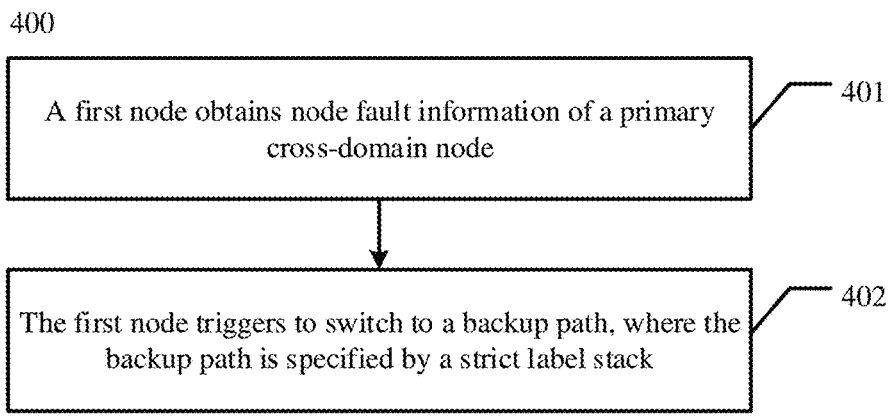
FIG. 4 is a schematic flowchart of a fault protection method 400 according to an embodiment of this application.

To resolve the foregoing problem, the embodiments of this application provide a fault protection method. FIG. 4 is a schematic flowchart of a fault protection method 400 according to an embodiment of this application.

As shown in FIG. 4, the fault protection method 400 provided in this embodiment of this application may include the following steps.

401: A head node determines that a primary cross-domain node is faulty.

The head node is a head node of an SR-BE tunnel. A network in which the SR-BE tunnel is located includes two IGP domains. The SR-BE tunnel is a cross-domain tunnel that passes through the two IGP domains. Routes of every two IGP domains may notify with each other by using a cross-domain node, and the SR-BE tunnel passes through the cross-domain node. For example, in the scenario corresponding to FIG. 3, the ASG 1 and the ASG 2 are cross-domain nodes, and the routes of the CSG 1 and the CSG 2 may be transmitted to the RSG 1 and the RSG 2 by using the ASG 1 or the ASG 2 respectively, and routes of the RSG 1 and the RSG 2 may also be transmitted to the CSG 1 and the CSG 2 by using the ASG 1 or the ASG 2 respectively. In this embodiment of this application, the head node obtains node fault information of the primary cross-domain node. The following provides further description with reference to FIG. 3. If a service transmission path is from the RSG 1 to the CSG 1, the head node obtains the node fault information of the primary cross-domain node, in other words, the RSG 1 obtains fault information of the ASG 1. For a process of selecting the primary cross-domain node and the secondary cross-domain node from the ASG 1 and the ASG 2, refer to the foregoing descriptions. Details are not described herein and below again. It should be noted that the head node may also be referred to as a first node or a source node, and a name of the node is not limited in this application.

In a specific implementation, the head node may obtain the fault information of the primary cross-domain node by using a bidirectional forwarding detection (BFD) protocol. Specifically, the head node may establish in advance BFD for detecting a node fault, for example, seamless bidirectional forwarding detection (S-BFD), with the primary cross-domain node, to determine that the primary cross-domain node is faulty.

402: The head node switches the service transmission path to a backup tunnel. The backup tunnel is a tunnel with a strict explicit path.

After obtaining that the primary cross-domain node is faulty, the head node switches to the backup tunnel. The backup tunnel is a tunnel that is pre-generated by the head node and that does not pass through the primary cross-domain node. The backup tunnel is also a tunnel that passes through two IGP domains. The backup tunnel is the tunnel with a strict explicit path, in other words, the backup tunnel is specified by the strict label stack, so that a service packet can be forwarded along the backup tunnel.

It can be learned from the method 400 that the backup tunnel needs to be pre-stored in the head node, so that the head node may directly switch to the backup tunnel after determining that the primary cross-domain node is faulty. It should be noted that the backup tunnel may be determined by using different methods. In some embodiments, the backup tunnel is a shortest path from the head node to a tail node. In some embodiments, the backup tunnel is a path including a shortest path from the head node to the secondary cross-domain node and a shortest path from the secondary cross-domain node to the tail node. In addition, in terms of different backup tunnel calculation methods, packet forwarding processes after switching to the backup tunnel are different. In some embodiments, after switching to the backup path, the head node sends a packet in which a label stack is encapsulated. The packet specifies, by using the label stack, each node that the backup tunnel passes through from the head node to the tail node. In some embodiments, after switching to the backup path, the head node sends a packet in which a label stack is encapsulated. The packet specifies, by using the label stack, each node that the backup tunnel passes through from the head node to the secondary cross-domain node. The following describes the foregoing several cases in detail.

In a first case, the backup tunnel is the shortest path from the head node to the tail node.

Figure 5:
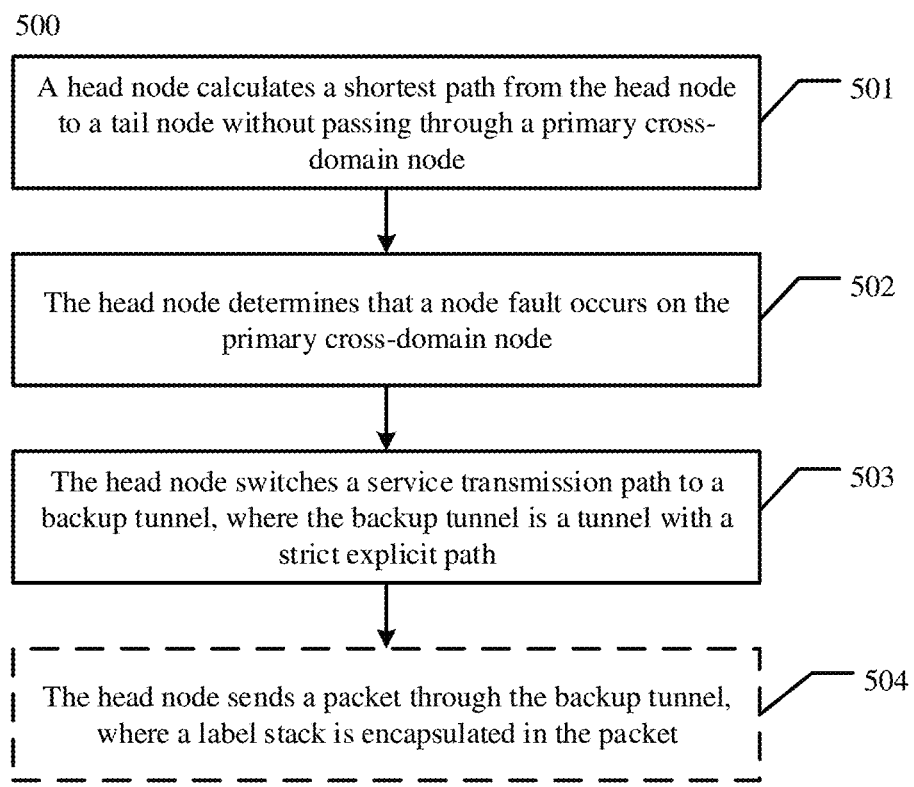
FIG. 5 is a schematic flowchart of a fault protection method 500 according to an embodiment of this application.

FIG. 5 is a schematic flowchart of a fault protection method 500 according to an embodiment of this application.

As shown in FIG. 5, the fault protection method 500 provided in this embodiment of this application may include the following steps.

501: A head node determines a shortest path from the head node to a tail node without passing through a primary cross-domain node.

The head node calculates the shortest path from the head node to the tail node in a first set, and the first set includes other nodes than the primary cross-domain node in an SR-BE network, in other words, the first set does not include the primary cross-domain node. The shortest path is a backup tunnel, and the backup tunnel is specified by using a strict label stack, so that a packet is forwarded to the tail node along the backup tunnel.

In a specific implementation, the head node may calculate the shortest path from the head node to the tail node in the first set according to an SPF algorithm. The following provides description with reference to the scenario shown in FIG. 3. It is assumed that the packet is forwarded from the RSG 1 to the CSG 1, in other words, the RSG 1 is the head node, and the CSG 1 is the tail node. It is assumed that a COST value between the RSG 1 and the RSG 2 is 20, a COST value between the RSG 2 and the ASG 2 is 20, a COST value between the ASG 2 and the CSG 2 is 100, a COST value between the CSG 2 and the CSG 1 is 100, a COST value between the RSG 1 and the ASG 1 is 20, a COST value between the CSG 1 and the ASG 1 is 100, and a COST value between the ASG 1 and the ASG 2 is 110. A method of calculating the shortest path may include the following steps.

Step 1: All nodes are divided into two sets, namely, an S set and a U set. The head node RSG 1 is selected into the S set. In this case, the S set includes the RSG 1. The primary cross-domain node ASG 1 is deleted, and other nodes are selected into the U set, to be specific, the U set includes four nodes: the RSG 2, the ASG 2, the CSG 2, and the CSG 1. The COST value from the head node RSG 1 to the RSG 2 is 20, a COST value from the RSG 1 to the ASG 2 is 40, and a COST value from the RSG 1 to any other node in the network is greater than the COST value from the RSG 1 to the RSG 2. It is determined that the COST value from the RSG 1 to the RSG 2 is the smallest.

Step 2: The RSG 2 is selected into the S set, to be specific, the S set includes two nodes: the RSG 1 and the RSG 2. The RSG 2 is deleted from the U set, to be specific, the U set includes three nodes: the ASG 2, the CSG 2, and the CSG 1. Because in step 1, the COST value from the RSG 1 to the RSG 2 is the smallest, searching continues along the path. A COST value from the RSG 1 to the RSG 2 to the ASG 2 is 100, and a COST value from the RSG 1 to the RSG 2 to any other node is greater than 100. It is determined that the COST value from the RSG 1 to the RSG 2 to the ASG 2 is the smallest.

Step 3: The ASG 2 is selected into the S set, to be specific, the S set includes three nodes: the RSG 1, the RSG 2, and the ASG 2. The ASG 2 is deleted from the U set, to be specific, the U set includes two nodes: the CSG 2 and the CSG 1. Because in step 2, the COST value from the RSG 1 to the RSG 2 to the ASG 2 is the smallest, searching continues along the path. A COST value from the RSG 1 to the RSG 2 to the ASG 2 to the CSG 2 is 140, and a COST value from the RSG 1 to the RSG 2 to the ASG 2 to any other node is greater than 140. It is determined that the COST value from the RSG 1 to the RSG 2 to the ASG 2 to the CSG 2 is the smallest.

Step 4: The CSG 2 is selected into the S set, to be specific, the S set includes four nodes: the RSG 1, the RSG 2, the ASG 2, and the CSG 2. The CSG 2 is deleted from the U set, to be specific, the U set includes the CSG 1. Because in step 3, the COST value from the RSG 1 to the RSG 2 to the ASG 2 to the CSG 2 is the smallest, searching continues along the path. It is determined that a COST value from the RSG 1 to the RSG 2 to the ASG 2 to the CSG 2 to the CSG 1 is the smallest.

Step 5: The CSG 1 is selected into the S set, to be specific, the S set includes the RSG 1, the RSG 2, the ASG 2, the CSG 2, and the CSG 1. It is determined that the shortest path from the head node RSG 1 to the tail node CSG 1 is found, namely, from the RSG 1 to the RSG 2 to the ASG 2 to the CSG 2 to the CSG 1. Searching ends.

Based on the foregoing searching process, it is determined that the backup tunnel is from the RSG 1 to the RSG 2 to the ASG 2 to the CSG 2 to the CSG 1. The backup tunnel is a path with a strict explicit path and is specified by using the strict label stack, namely, [adj (RSG 1→RSG 2), adj(RSG 2→ASG 2), adj(ASG 2→CSG 2), adj(CSG 2→CSG 1)].

502: The head node determines that the primary cross-domain node is faulty.

503: The head node switches a service transmission path to the backup tunnel. The backup tunnel is the tunnel with a strict explicit path.

In a specific implementation, step 504 may be further included: The head node sends the packet through the backup tunnel, and a label stack is encapsulated in the packet. Further, the packet specifies, by using the label stack, each node that the backup tunnel passes through from the head node to the tail node.

For understanding of step 502 and step 503 in this embodiment, refer to step 401 and step 402 in the embodiment corresponding to FIG. 4. Details are not described herein again.

In a second case, the backup tunnel is the path including the shortest path from the head node to the secondary cross-domain node and the shortest path from the secondary cross-domain node to the tail node.

Figure 6:
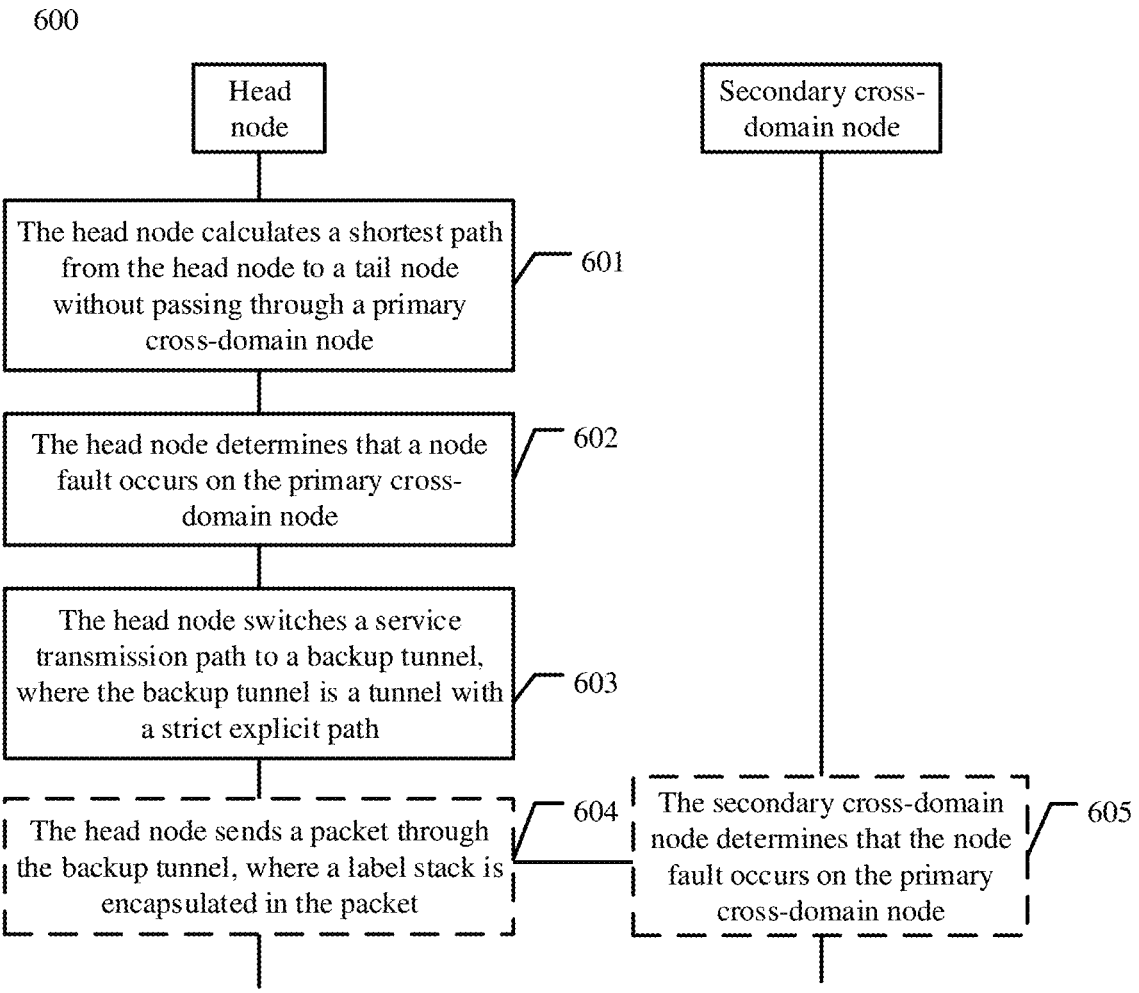
FIG. 6 is a schematic flowchart of a fault protection method 600 according to an embodiment of this application.

FIG. 6 is a schematic diagram of a fault protection method 60o according to an embodiment of this application.

As shown in FIG. 6, the fault protection method 60o provided in this embodiment of this application may include the following steps.

601: A head node determines a shortest path from the head node to a secondary cross-domain node without passing through a primary cross-domain node.

The head node calculates the shortest path from the head node to the secondary cross-domain node in a second set, and the second set includes all nodes except the primary cross-domain node in an IGP domain in which the head node is located, or the second set includes other nodes than the primary cross-domain node in an SR-BE network, in other words, the second set does not include the primary cross-domain node. The backup tunnel is specified by using a strict label stack, so that a packet is forwarded to the secondary cross-domain node along the backup tunnel.

In a specific implementation, the head node may calculate the shortest path from the head node to the secondary cross-domain node in the second set according to an SPF algorithm. The following provides description with reference to the scenario shown in FIG. 3 and by using an example in which the second set includes all nodes except the primary cross-domain node in the IGP domain in which the head node is located. It is assumed that the ASG 1 is the primary cross-domain node and the ASG 2 is the secondary cross-domain node. It is assumed that a COST value between the RSG 1 and the RSG 2 is 20, a COST value between the RSG 2 and the ASG 2 is 20, a COST value between the RSG 1 and the ASG 1 is 20, and a COST value between the ASG 1 and the ASG 2 is 110. A method of calculating the shortest path may include the following steps.

Step 1: All nodes are divided into two sets, namely, an S set and a U set. The head node RSG 1 is selected into the S set. In this case, the S set includes the RSG 1. The primary cross-domain node ASG 1 is deleted, and other nodes are selected into the U set, to be specific, the U set includes two nodes: the RSG 2 and the ASG 2. The COST value from the head node RSG 1 to the RSG 2 is 20, and a COST value from the RSG 1 to the ASG 2 is 40. It is determined that the COST value from the RSG 1 to the RSG 2 is the smallest.

Step 2: The RSG 2 is selected into the S set, to be specific, the S set includes two nodes: the RSG 1 and the RSG 2. The RSG 2 is deleted from the U set, to be specific, the U set includes one node: the ASG 2. Because in step 1, the COST value from the RSG 1 to the RSG 2 is the smallest, searching continues along the path. A COST value from the RSG 1 to the RSG 2 to the ASG 2 is 100.

Step 3: The ASG 2 is selected into the S set, to be specific, the S set includes the RSG 1, the RSG 2, and the ASG 2. It is determined that the shortest path from the head node RSG 1 to the secondary cross-domain node ASG 2 is found, namely, from the RSG 1 to the RSG 2 to the ASG 2. Searching is ended.

Based on the foregoing searching process, it is determined that the backup tunnel is from the RSG 1 to the RSG 2 to the ASG 2. The backup tunnel is specified by using the strict label stack, namely, [adj(RSG 1→RSG 2), adj(RSG 2→ASG 2)].

602: The head node determines that the primary cross-domain node is faulty.

For understanding of step 602, refer to step 401 in the embodiment corresponding to FIG. 4. Details are not described herein again.

603: The head node switches a service transmission path to the backup tunnel. The backup tunnel is a tunnel with a strict explicit path.

In a specific implementation, step 604 may be further included: The head node sends the packet through the backup tunnel, and a label stack is encapsulated in the packet. Further, the packet specifies, by using the label stack, each node that the backup tunnel passes through from the head node to the secondary cross-domain node.

In a specific implementation, step 6o5 may be further included: The secondary cross-domain node determines that the primary cross-domain node is faulty.

Further, the secondary cross-domain node may obtain fault information of the primary cross-domain node through BFD. The head node may establish in advance BFD for detecting a node fault, for example, seamless bidirectional forwarding detection (S-BFD), with the primary cross-domain node, to determine that the primary cross-domain node is faulty. In some embodiments, if the packet has been forwarded to the secondary cross-domain node, and the shortest path from the secondary cross-domain node to the tail node does not need to pass through the primary cross-domain node, the secondary cross-domain node may reliably forward the packet to the tail node. When the shortest path from the secondary cross-domain node to the tail node still needs to pass through the primary cross-domain node, the BFD may be established in advance between the primary cross-domain node and the secondary cross-domain node. When the packet is forwarded to the secondary cross-domain node, the secondary cross-domain node may obtain, through the BFD, whether the primary cross-domain node is faulty. If the secondary cross-domain node obtains, through the BFD, that the primary cross-domain node is faulty, when the secondary cross-domain node forwards the packet to the tail node, the packet does not pass through the primary cross-domain node. In a specific implementation, after determining that the primary cross-domain node is faulty, the secondary cross-domain node may forward the packet to the tail node based on a backup tunnel pre-established by the secondary cross-domain node.

Figure 7:
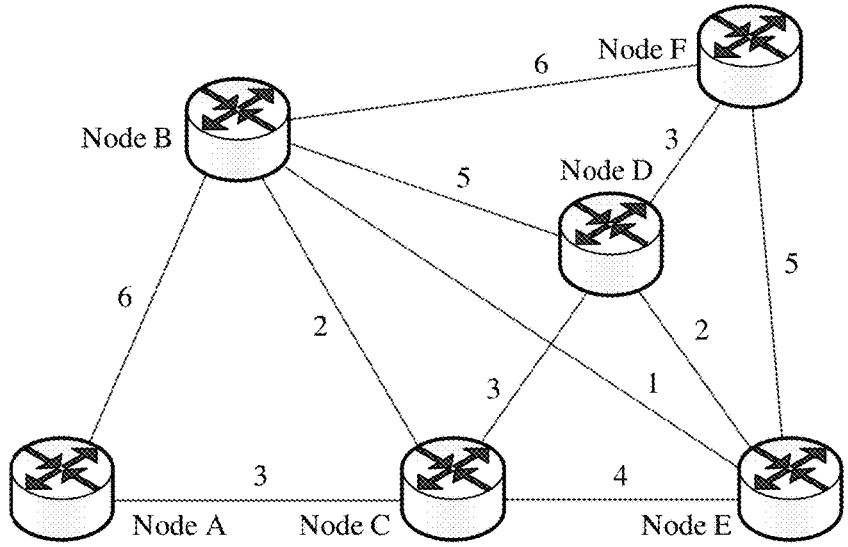
FIG. 7 is a schematic diagram of a networking structure applicable to a backup tunnel calculation method according to an embodiment of this application.

To better describe the backup tunnel calculation algorithm provided in this application, the following provides description with reference to FIG. 7. As shown in FIG. 7, it is assumed that an SR-BE network includes a router node A, a router node B, a router node C, a router node D, a router node E, and a router node F. It is assumed that a COST value between the node A and the node B is 6, a COST value between the node A and the node C is 3, a COST value between the node B and the node C is 2, a COST value between the node B and the node F is 6, a COST value between the node B and the node D is 5, a COST value between the node B and the node E is 1, a COST value between the node C and the node D is 3, a COST value between the node C and the node E is 4, a COST value between the node D and the node E is 2, a COST value between the node D and the node F is 3, and a COST value between the node E and the node F is 5. It is assumed that a target path that needs to be calculated is from the node A to the node E without passing through the node D, and the target path is equivalent to the shortest path that is from the head node to the tail node without passing through the primary cross-domain node in the embodiment corresponding to FIG. 5. Alternatively, the target path is equivalent to the shortest path that is from the head node to the secondary cross-domain node without passing through the primary cross-domain node in the embodiment corresponding to FIG. 6. A method used by the secondary cross-domain node to calculate a shortest path from the secondary cross-domain node to the tail node is similar to the method used by the head node to calculate the shortest path. Details are not described herein again. The following steps may be included.

Step 1: All nodes are divided into two sets, namely, an S set and a U set. The head node, namely, the node A, is selected into the S set. In this case, the S set includes the node A. The node D is deleted, and other nodes are selected into the U set. In this case, the U set includes four nodes: the node B, the node C, the node E, and the node F. The COST value from the node A to the node C is 3, and the COST value from the node A to the node B is 6. Therefore, the COST value from the node A to the node C is the smallest.

Step 2: The node C is selected into the S set, to be specific, the S set includes two nodes: the node A and the node C. Searching continues along a path from the node A to the node C. The node C is deleted, to be specific, the U set includes three nodes: the node B, the node E, and the node F. A COST value from the node A to the node C to the node B is 5, and is less than the COST value 6 from the node A to the node B in step 1. In this case, a shortest path is updated, namely, from the node A to the node C to the node B. A COST value from the node A to the node C to the node E is 7, and a COST value from the node A to the node C to any other node in the U set is infinite. Therefore, it is determined that the COST value from the node A to the node C to the node B is the smallest.

Step 3: The node B is selected into the S set, to be specific, the S set includes three nodes: the node A, the node C, and the node B. Searching continues along the path from the node A to the node C to the node B. The node B is deleted, to be specific, the U set includes two nodes: the node E and the node F. A COST value from the node A to the node C to the node B to the node E is 6, and is less than the COST value from the node A to the node C to the node E in step 2. Then, a shortest path is updated to a path from the node A to the node C to the node B to the node E. A COST value from the node A to the node C to the node B to the node F is 11, and a COST value from the node A to the node C to the node B to any other node in the U set is infinite. Therefore, it is determined that the COST value from the node A to the node C to the node B to the node E is the smallest.

Step 4: The node E is selected into the S set, to be specific, the S set includes four nodes: the node A, the node C, the node B, and the node E. In this case, a shortest path from the node A as the head node to the node E as the tail node without passing through the node D, namely, from the node A to the node C to the node B to the node E. Searching ends.

Based on the foregoing searching process, it is determined that the target path is from the node A to the node C to the node B to the node E, and the target path is specified by using a strict label stack, namely, [adj(node A→node C), adj(node C→node B), adj(node B→node E)].

Figure 8:
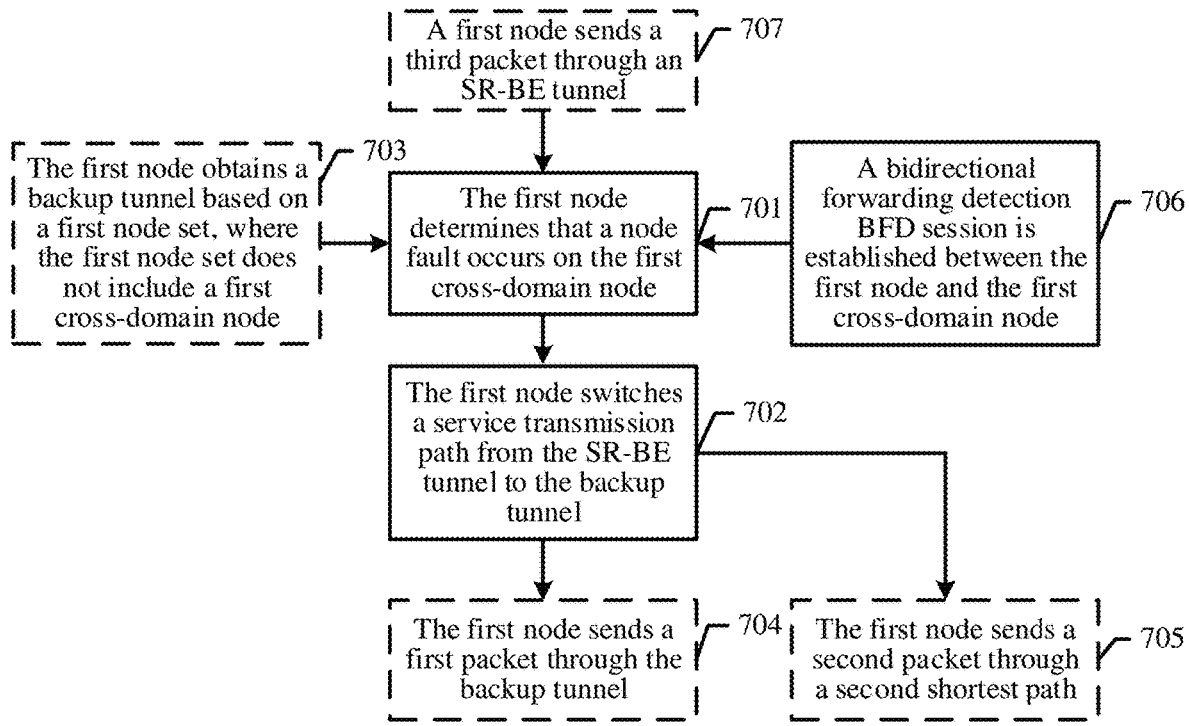
FIG. 8 is a schematic flowchart of a fault protection method 700 according to an embodiment of this application.

FIG. 8 is a schematic flowchart of a fault protection method 700 according to an embodiment of this application.

As shown in FIG. 8, the fault protection method 700 provided in this embodiment of this application is applicable to the scenario corresponding to FIG. 3 and may include the following steps.

701: A first node determines that a first cross-domain node is faulty.

The first node is a head node of a segment routing best effort SR-BE service tunnel, the SR-BE tunnel is a cross-domain tunnel that passes through a first IGP domain and a second IGP domain, the SR-BE tunnel passes through the first cross-domain node, and the first cross-domain node is a node that crosses the first IGP domain and the second IGP domain. When the method 700 is used to perform the method 400, the method 500, or the method 600, the first node is equivalent to the head node in the method 400, the method 500, or the method 600, the first cross-domain node is equivalent to the primary cross-domain node in the method 400, the method 500, or the method 600, and the first IGP domain and the second IGP domain may be equivalent to the first IGP domain and the second IGP domain in the scenario corresponding to FIG. 3. Details are not described below again.

702: The first node switches a service transmission path from the SR-BE tunnel to a backup tunnel.

The backup tunnel does not pass through the first cross-domain node, the backup tunnel is a cross-domain tunnel that passes through the first IGP domain and the second IGP domain, and the backup tunnel is a tunnel with a strict explicit path. When the method 700 is used to perform the method 400, the method 500, or the method 600, the backup tunnel is equivalent to the backup tunnel in the method 400, the method 500, or the method 600. Details are not described below again.

In a specific implementation, the method 700 further includes 703: The first node obtains the backup tunnel based on a first node set. The first node set does not include the first cross-domain node. When the method 700 is used to perform the method 500 or the method 600, the first node set is equivalent to the first set in the method 500 or is equivalent to the second set in the method 600. Details are not described below again.

In a specific implementation, that the first node obtains the backup tunnel based on a first node set specifically includes: The first node determines a first shortest path from the first node to a tail node based on the first node set. The first shortest path is the backup tunnel.

In a specific implementation, after the first node switches the service transmission path from the SR-BE tunnel to the backup tunnel, the method 700 further includes 704: The first node sends a first packet through the backup tunnel. A label stack is encapsulated in the first packet, and the label stack specifies each node that the backup tunnel passes through. When the method 700 is used to perform the method 500 or the method 600, the first packet is equivalent to the packet described in step 504 in the method 500.

In a specific implementation, that the first node obtains the backup tunnel based on a first node set specifically includes: The first node determines a second shortest path from the first node to a second cross-domain node based on the first node set. The second shortest path and a third shortest path from the second cross-domain node to a tail node jointly form the backup tunnel, the third shortest path does not pass through the first cross-domain node, and the second cross-domain node is a node that crosses the first IGP domain and the second IGP domain. When the method 700 is used to perform the method 500 or the method 600, the second cross-domain node is equivalent to the secondary cross-domain node in the method 400, the method 500, or the method 600. The second shortest path is equivalent to the shortest path from the head node to the secondary cross-domain node without passing through the primary cross-domain node in the method 600, and the third shortest path is equivalent to the path from the secondary cross-domain node to the tail node without passing through the primary cross-domain node in the method 600, or is equivalent to the backup tunnel pre-established by the secondary cross-domain node in the method 600.

In a specific implementation, after the first node switches the service transmission path from the SR-BE tunnel to the backup tunnel, the method 700 further includes 705: The first node sends a second packet through the second shortest path. A label stack is encapsulated in the second packet, and the label stack specifies each node that the second shortest path passes through. When the method 700 is used to perform the method 500 or the method 600, the second packet is equivalent to the packet described in step 604 in the method 600.

In a specific implementation, before the first node determines that the first cross-domain node is faulty, the method 700 further includes 706: A bidirectional forwarding detection BFD session is established between the first node and the first cross-domain node. That a first node determines that a first cross-domain node is faulty may specifically include: The first node determines, based on the BFD session, that the first cross-domain node is faulty.

In a specific implementation, before the first node determines that the first cross-domain node is faulty, the method 700 further includes the following.

707: The first node sends a third packet through the SR-BE tunnel. An outer label of the third packet is a node label of a next hop to a destination address.

The foregoing mainly describes the solutions provided in the embodiments of this application from a perspective of interaction between nodes. It may be understood that, to implement the foregoing functions, the foregoing head node includes a corresponding hardware structure and/or a software module for performing the function. A person skilled in the art should be easily aware that, in combination with example modules and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of a hardware structure, the head node in FIG. 4 to FIG. 6 and the first node in FIG. 8 may be implemented by a physical device or jointly implemented by a plurality of physical devices, or may be a logical function module inside a physical device. This is not specifically limited in the embodiments of this application.

Figure 9:
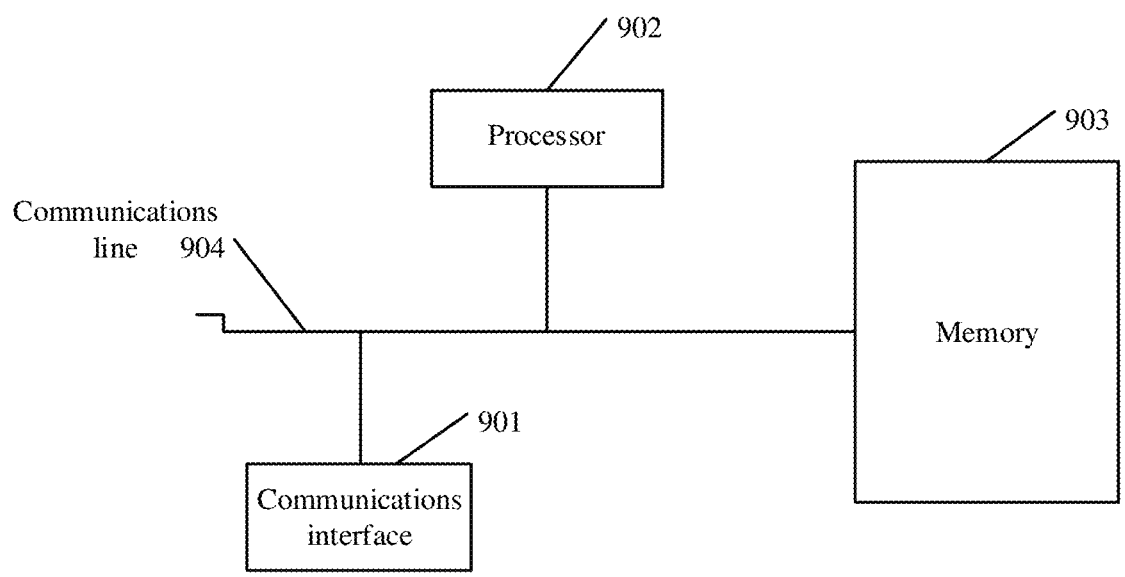
FIG. 9 is another schematic diagram of a hardware structure of a communications device according to an embodiment of this application.

For example, the head node may be implemented by using a communications device in FIG. 9. FIG. 9 is a schematic diagram of a hardware structure of a communications device according to an embodiment of this application. The communications device includes a communications interface 901 and a processor 902, and may further include a memory 903.

The communications interface 901 may use any apparatus such as a transceiver, to communicate with another device or a communications network, such as the Ethernet, a radio access network (RAN), or a wireless local area network (WLAN).

The processor 902 includes but is not limited to one or more of a central processing unit (CPU), a network processor (NP), an application-specific integrated circuit (ASIC), or a programmable logic device (PLD). The PLD may be a complex programmable logic device (CPLD), a field programmable gate array (FPGA), generic array logic (GAL), or any combination thereof. The processor 902 is responsible for management of a communications line 904 and general processing, may be a peripheral interface, and may further provide various functions, including timing, voltage regulation, power management, and another control function. The memory 903 may be configured to store data used by the processor 902 when the processor 902 performs an operation.

The memory 903 may include but is not limited to a content-addressable memory (CAM), for example, a ternary content-addressable memory (TCAM), or a random access memory (RAM).

The memory 903 may alternatively be integrated into the processor 902. If the memory 903 and the processor 902 are components independent of each other, the memory 903 is connected to the processor 902. For example, the memory 903 may communicate with the processor 902 by using the communications line. The network interface 901 may communicate with the processor 902 by using the communications line, or the network interface 901 may be directly connected to the processor 902.

The communications line 904 may include any quantity of interconnected buses and bridges, and the communications line 904 links together various circuits that include one or more processors 902 represented by the processor 902 and a memory represented by the memory 903. The communications line 904 may further links together other circuits such as a peripheral device, a voltage regulator, and a power management circuit. These are well known in the art, and therefore are not further described in this application.

In a specific implementation, the first node includes the memory 903 and the processor 902 connected to the memory 903.

The processor 902 is configured to execute a computer-readable instruction in the memory 903, to perform the following operation: determining that a first cross-domain node is faulty. The first node is a head node of a segment routing best effort SR-BE service tunnel, the SR-BE tunnel is a cross-domain tunnel that passes through a first IGP domain and a second IGP domain, the SR-BE tunnel passes through the first cross-domain node, and the first cross-domain node is a node that crosses the first IGP domain and the second IGP domain.

The processor 902 is further configured to execute a computer-readable instruction in the memory 903, to perform the following operation: switching a service transmission path from the SR-BE tunnel to a backup tunnel. The backup tunnel does not pass through the first cross-domain node, the backup tunnel is a cross-domain tunnel that passes through the first IGP domain and the second IGP domain, and the backup tunnel is a tunnel with a strict explicit path.

In a specific implementation, the processor 902 is further configured to execute a computer-readable instruction in the memory 903, to perform the following operation: obtaining the backup tunnel based on a first node set. The first node set does not include the first cross-domain node.

In a specific implementation, the processor 902 is specifically configured to execute a computer-readable instruction in the memory 903, to perform the following operation: determining a first shortest path from the first node to a tail node based on the first node set. The first shortest path is the backup tunnel.

In a specific implementation, the communications interface 901 is configured to send a first packet through the backup tunnel, after the processor 902 switches the service transmission path from the SR-BE tunnel to the backup tunnel. A label stack is encapsulated in the first packet, and the label stack specifies each node that the backup tunnel passes through.

In a specific implementation, the processor 902 is specifically configured to execute a computer-readable instruction in the memory 903, to perform the following operation: determining a second shortest path from the first node to a second cross-domain node based on the first node set. The second shortest path and a third shortest path from the second cross-domain node to the tail node jointly form the backup tunnel, the third shortest path does not pass through the first cross-domain node, and the second cross-domain node is a node that crosses the first IGP domain and the second IGP domain.

In a specific implementation, the communications interface 901 is further configured to send a second packet through the second shortest path, after the processor 902 switches the service transmission path from the SR-BE tunnel to the backup tunnel. A label stack is encapsulated in the second packet, and the label stack specifies each node that the second shortest path passes through.

In a specific implementation, the processor 902 is further configured to execute a computer-readable instruction in the memory 903, to perform the following operations: before determining that the first cross-domain node is faulty, establishing a bidirectional forwarding detection BFD session between the first node and the first cross-domain node, and determining that the first cross-domain node is faulty based on the BFD session.

In a specific implementation, the communications interface 901 is further configured to send a third packet through the SR-BE tunnel, before the processor 902 determines that the first cross-domain node is faulty. An outer label of the third packet is a node label of a next hop to a destination address.

In the embodiments of this application, the first node may be divided into function modules based on the foregoing method examples. For example, function modules corresponding to the functions may be obtained through division, or two or more functions may be integrated into one processing module. The integrated module may be implemented in a form of hardware, or may be implemented in a form of a software function module. It should be noted that, in the embodiments of this application, division into modules is an example, and is merely logical function division. During actual implementation, another division manner may be used.

Figure 10:
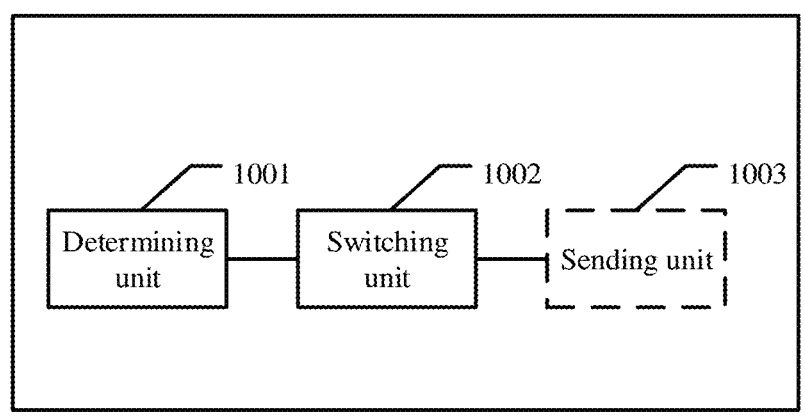
FIG. 10 is a schematic structural diagram of a node according to an embodiment of this application.

For example, when the function modules are obtained through division in an integrated manner, FIG. 10 is a schematic structural diagram of a head node.

As shown in FIG. 10, the node provided in this embodiment of this application may include a determining unit 1001 and a switching module 1002.

The determining unit 1001 is configured to perform step 401 in the method 400, steps 501 and 502 in the method 500, steps 601 and 602 in the method 600, and steps 701, 703, and 706 in the method 700.

The switching unit 1002 is configured to perform step 402 in the method 400, step 503 in the method 500, step 603 in the method 600, and step 702 in the method 700.

In a specific implementation, the head node may further include a sending unit 1003, configured to perform step 504 in the method 500, step 604 in the method 600, and steps 704, 705, and 707 in the method 700.

In the foregoing embodiment, the head node is presented in a form in which function modules are obtained through division in an integrated manner. It is clearly that, in this embodiment of this application, function modules of the head node corresponding to the functions may be obtained through division. This is not specifically limited in this embodiment of this application.

In a specific implementation, this embodiment of this application provides a chip system. The chip system includes a processor, configured to support the head node to implement the foregoing fault protection method. In a possible design, the chip system further includes a memory. The memory is configured to store a program instruction and data that are necessary for the head node. The chip system may include a chip, or may include a chip and another discrete component. This is not specifically limited in this embodiment of this application.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the steps of the methods in the embodiments may be implemented by a program instructing related hardware. The program may be stored in a computer-readable storage medium. The storage medium may include a ROM, a RAM, a magnetic disk, an optical disc, or the like.

The foregoing describes in detail a fault protection method, a node, and a storage medium provided in the embodiments of this application. The principle and implementation of this application are described herein through specific examples. The description about the embodiments is merely provided to help understand the method and core ideas of this application. In addition, persons of ordinary skill in the art can make variations and modifications to this application in terms of the specific implementations and application scopes according to the ideas of this application. Therefore, the content of specification shall not be construed as a limit to this application.

What is claimed is:

1. A method, comprising:
    determining, by a first node, that a first cross-domain node is faulty, wherein the first node is a head node of a segment routing best effort (SR-BE) tunnel, the SR-BE tunnel is a cross-domain tunnel that passes through a first interior gateway protocol (IGP) domain and a second IGP domain, the SR-BE tunnel passes through the first cross-domain node, wherein, in a forwarding process of the SR-BE tunnel, the head node of the SR-BE tunnel sends a packet encapsulated with an outer label through the SR-BE tunnel, and the outer label of the packet is a first node label of a first intermediate node to a tail node of the SR-BE tunnel, wherein, when the first intermediate node receives the packet, the first intermediate node changes the first node label to a second node label of a second intermediate node to the tail node, wherein the first node label and the second node label are respectively calculated by the first intermediate node and the second intermediate node based on a prefix SID advertised by the tail node, and wherein the first cross-domain node crosses the first IGP domain and the second IGP domain; and in response to the determining, switching, by the first node, a service transmission path from the SR-BE tunnel to a backup tunnel, wherein the backup tunnel does not pass through the first cross-domain node, the backup tunnel is a second cross-domain tunnel that passes through the first IGP domain and the second IGP domain, and the backup tunnel has a strict explicit path specified using a strict label stack for all nodes along the backup tunnel from the first node to the tail node of the backup tunnel, the strict explicit path prestored in the first node.

2. The method according to claim 1, further comprising: obtaining, by the first node, the backup tunnel based on a first node set, wherein the first node set does not comprise the first cross-domain node.

3. The method according to claim 2, wherein obtaining, by the first node, the backup tunnel based on the first node set comprises:
determining, by the first node, a first shortest path from the first node to the tail node based on the first node set, wherein the first shortest path is the backup tunnel.

4. The method according to claim 2, wherein obtaining, by the first node, the backup tunnel based on the first node set comprises:
determining, by the first node, a second shortest path from the first node to a second cross-domain node based on the first node set, wherein the second shortest path and a third shortest path from the second cross-domain node to the tail node jointly form the backup tunnel, the third shortest path does not pass through the first cross-domain node, and the second cross-domain node crosses the first IGP domain and the second IGP domain.

5. The method according to claim 4, further comprising: after switching, by the first node, the service transmission path from the SR-BE tunnel to the backup tunnel, sending, by the first node, a second packet through the second shortest path, wherein a second strict label stack is encapsulated in the second packet.

6. The method according to claim 1, further comprising: after switching, by the first node, the service transmission path from the SR-BE tunnel to the backup tunnel, sending, by the first node, a first packet through the backup tunnel, wherein the strict label stack is encapsulated in the first packet.

7. The method according to claim 1, further comprising: before determining, by the first node, that the first cross-domain node is faulty, establishing a bidirectional forwarding detection (BFD) session between the first node and the first cross-domain node; and wherein determining, by the first node, that the first cross-domain node is faulty comprises:
determining, by the first node based on the BFD session, that the first cross-domain node is faulty.

8. The method according to claim 1, further comprising: before determining, by the first node, that the first cross-domain node is faulty, sending, by the first node, a third packet through the SR-BE tunnel, wherein an outer label of the third packet is a node label of a next hop to a destination address.

9. A first node, comprising:
a memory comprising instructions, and
a processor connected to the memory, wherein when the instructions are executed by the processor, the instructions cause the first node to perform operations including:
determining that a first cross-domain node is faulty, wherein the first node is a head node of a segment routing best effort (SR-BE) tunnel, the SR-BE tunnel is a cross-domain tunnel that passes through a first interior gateway protocol (IGP) domain and a second IGP domain, the SR-BE tunnel passes through the first cross-domain node, wherein, in a forwarding process of the SR-BE tunnel, the head node of the SR-BE tunnel sends a packet encapsulated with an outer label through the SR-BE tunnel, and the outer label of the packet is a first node label of a first intermediate node to a tail node of the SR-BE tunnel, wherein, when the first intermediate node receives the packet, the first intermediate node changes the first node label to a second node label of a second intermediate node to the tail node, wherein the first node label and the second node label are respectively calculated by the first intermediate node and the second intermediate node based on a prefix SID advertised by the tail node, and wherein the first cross-domain node crosses the first IGP domain and the second IGP domain; and in response to the determining, switching a service transmission path from the SR-BE tunnel to a backup tunnel after the first cross-domain node is faulty, wherein the backup tunnel does not pass through the first cross-domain node, the backup tunnel is a second cross-domain tunnel that passes through the first IGP domain and the second IGP domain, and the backup tunnel has a strict explicit path specified using a strict label stack for all nodes along the backup tunnel from the first node to the tail node of the backup tunnel, the strict explicit path prestored in the first node.

10. The first node according to claim 9, the operations further including:
obtaining the backup tunnel based on a first node set, wherein the first node set does not comprise the first cross-domain node.

11. The first node according to claim 10, the operations further comprising:
determining a first shortest path from the first node to the tail node based on the first node set, wherein the first shortest path is the backup tunnel.

12. The first node according to claim 10, the operations further comprising:
determining a second shortest path from the first node to a second cross-domain node based on the first node set, wherein the second shortest path and a third shortest path from the second cross-domain node to the tail node jointly form the backup tunnel, the third shortest path does not pass through the first cross-domain node, and the second cross-domain node crosses the first IGP domain and the second IGP domain.

13. The first node according to claim 12, further comprising:
a communications interface connected to the processor and the memory, wherein the communications interface is configured to send a second packet through the second shortest path after the processor switches the service transmission path from the SR-BE tunnel to the backup tunnel, wherein a second strict label stack is encapsulated in the second packet.

14. The first node according to claim 9, further comprising:
a communications interface connected to the processor and the memory, wherein the communications interface is configured to send a first packet through the backup tunnel, the strict label stack is encapsulated in the first packet.

15. The first node according to claim 9, the operations further comprising:
establishing a bidirectional forwarding detection (BFD) session between the first node and the first cross-domain node before determining the first cross-domain node is faulty; and
determining, based on the BFD session, that the first cross-domain node is faulty.

16. The first node according to claim 9, further comprising:
a communications interface connected to the processor and the memory, wherein the communications interface is configured to send a third packet through the SR-BE tunnel before it is determined that the first cross-domain node is faulty, wherein an outer label of the third packet is a node label from a next hop to a destination address.

17. A non-transitory computer-readable storage medium, wherein when instructions stored on the non-transitory computer-readable storage medium are run on a computer apparatus, the computer apparatus is enabled to perform operations including:
determining that a first cross-domain node is faulty, wherein a first node to which the computer apparatus is applied is a head node of a segment routing best effort (SR-BE) tunnel, the SR-BE tunnel is a cross-domain tunnel that passes through a first interior gateway protocol (IGP) domain and a second IGP domain, the SR-BE tunnel passes through the first cross-domain node, wherein, in a forwarding process of the SR-BE tunnel, the head node of the SR-BE tunnel sends a packet encapsulated with an outer label through the SR-BE tunnel, and the outer label of the packet is a first node label of a first intermediate node to a tail node of the SR-BE tunnel, wherein, when the first intermediate node receives the packet, the first intermediate node changes the first node label to a second node label of a second intermediate node to the tail node, wherein the first node label and the second node label are respectively calculated by the first intermediate node and the second intermediate node based on a prefix SID advertised by the tail node, and wherein the first cross-domain node crosses the first IGP domain and the second IGP domain; and
in response to the determining, switching a service transmission path from the SR-BE tunnel to a backup tunnel, wherein the backup tunnel does not pass through the first cross-domain node, the backup tunnel is a second cross-domain tunnel that passes through the first IGP domain and the second IGP domain, and the backup tunnel is a tunnel with a strict explicit path specified using a strict label stack for all nodes along the backup tunnel from the first node to the tail node of the backup tunnel, the strict explicit path prestored in the first node.

18. The non-transitory computer-readable storage medium according to claim 17, the operations further comprising:
obtaining the backup tunnel based on a first node set, wherein the first node set does not comprise the first cross-domain node.

19. The non-transitory computer-readable storage medium according to claim 18, the operations further comprising:
determining a first shortest path from the first node to the tail node based on the first node set, wherein the first shortest path is the backup tunnel.

20. The non-transitory computer-readable storage medium according to claim 17, the operations further comprising:
after the switching the service transmission path from the SR-BE tunnel to the backup tunnel, sending a first packet through the backup tunnel, wherein the strict label stack is encapsulated in the first packet.

* * * * *